United States Patent [19]

Ettenberg

[11] 4,383,311
[45] May 10, 1983

[54] OPTICAL RECORDING MEDIUM AND INFORMATION RECORD WITH INDENTED OVERCOAT

[75] Inventor: Michael Ettenberg, Freehold, N.J.

[73] Assignee: RCA Corporation, New York, N.Y.

[21] Appl. No.: 199,314

[22] Filed: Oct. 21, 1980

[51] Int. Cl.³ .............................................. G11B 7/26
[52] U.S. Cl. .................................. 369/275; 346/135.1
[58] Field of Search .................. 358/128.5, 128.6, 342; 346/76 L, 135.1; 369/16, 17, 13, 109, 110, 111, 275

[56] References Cited

U.S. PATENT DOCUMENTS

| | | | |
|---|---|---|---|
| 4,069,487 | 1/1978 | Kasai et al. | 346/76 L |
| 4,097,895 | 6/1978 | Spong | 369/275 |
| 4,101,907 | 7/1978 | Bell et al. | 346/135.1 |
| 4,216,501 | 8/1980 | Bell | 369/275 |
| 4,245,229 | 1/1981 | Stephens | 346/135.1 |
| 4,285,056 | 8/1981 | Bell | 346/135.1 |

Primary Examiner—Bernard Konick
Assistant Examiner—Donald McElheny, Jr.
Attorney, Agent, or Firm—B. E. Morris

[57] ABSTRACT

An improved overcoated optical recording medium comprises a light absorptive layer and an overcoat overlying the absorptive layer wherein the overcoat has a plurality of indentations in the surface which contacts the absorptive layer thereby forming a first region of the recording medium wherein the overcoat layer does not contact the absorptive layer and a second region wherein the overcoat layer does contact the absorptive layer. The recording sensitivity in the first region is greater since the heat loss to the overcoat layer in these regions is reduced and the mechanical constraints on the formation of deformations in the absorptive layer are relaxed. The invention also includes an improved information record having information recorded in a portion of the first region as a change in the local optical properties.

29 Claims, 4 Drawing Figures

OPTICAL RECORDING MEDIUM AND INFORMATION RECORD WITH INDENTED OVERCOAT

The Government has rights in this invention pursuant to a Government Contract.

The invention relates to an improved optical recording medium and in particular to an optical recording medium having a thick overcoat layer with a plurality of indentations therein.

BACKGROUND OF THE INVENTION

Information may be recorded by exposure of a portion of an optical recording medium to a recording light beam thereby changing its local optical properties. The simplest such recording medium is a layer of a light absorptive material overlying a substrate. The information is recorded by locally melting or ablating the recording medium to form an opening therein. The presence of the opening results in a local change in the transmission and reflectivity of the recording medium which is detected during readout.

Spong in U.S. Pat. No. 4,097,895, issued June 27, 1978, disclosed an optical recording medium which comprises a light reflective layer which is coated with a light absorptive layer, wherein the thickness of the absorptive layer is chosen so that the reflectivity of the recording medium is reduced. A focussed, modulated light beam directed at the recording medium melts or ablates an opening in the absorptive layer, thereby changing the reflectivity of the recording medium. During readout the difference in reflectivity between unexposed and exposed portions of the recording medium is detected optically and converted into an electrical signal representative of the information so recorded.

Bell, in U.S. Pat. No. 4,216,501, issued Aug. 5, 1980, has disclosed a trilayer optical recording medium having a transparent spacer layer interposed between the reflective and the absorptive layers of the Spong optical recording medium. The thickness of the absorptive layer is so related to the thickness of the spacer layer and to the optical constants of the reflective, spacer and absorptive layers so as to reduce the optical reflectivity on the recording medium. Energy absorbed from a focussed, modulated light beam ablates, melts or otherwise changes the optical properties of the absorptive layer, thereby changing the reflectivity of the recording medium. The trilayer optical recording medium permits the use of a broader class of materials in a low reflectivity recording medium than that provided by the recording medium disclosed by Spong.

Bloom et al. in now U.S. Pat. No. 4,315,269, has disclosed a thick protective overcoat layer for an optical recording medium. The thick overcoat layer overlies the absorptive layer of the optical recording medium and keeps dust or other particles which settle on the structure far removed from the focal plane of the recording lens so that the influence of such particles on the recording and readout is considerably reduced.

However, the effect of the overcoat layer on the recording of information in a recording medium is to reduce the recording sensitivity, since the overcoat provides a thermal sink for energy absorbed in the absorptive layer. Thus, more energy must be supplied to the absorptive layer in order to raise its temperature to the temperature at which a change the absorptive layer, such as an opening, can occur. For certain absorptive materials the overcoat layer may also inhibit the formation of a deformation because of mechanical constraints on the movement of the absorptive material during the recording process.

Thus, it would be desirable to have an optical recording medium having a thick overcoat layer which maintains its beneficial aspects while eliminating the undesirable side effects of the overcoat layer of Bloom et al.

SUMMARY OF THE INVENTION

The invention is an improved optical recording medium wherein the improvement comprises an overcoat layer having a plurality of indentations in the overcoat surface which contacts a light absorptive layer thereby creating a first region of the optical recording medium wherein the overcoat layer does not contact the absorptive layer and a second region wherein the overcoat layer does contact the absorptive layer. The invention also comprises an improved information record having information recorded in a portion of the region wherein the overcoat layer does not contact the absorptive layer.

DETAILED DESCRIPTION OF THE INVENTION

Figure 1:
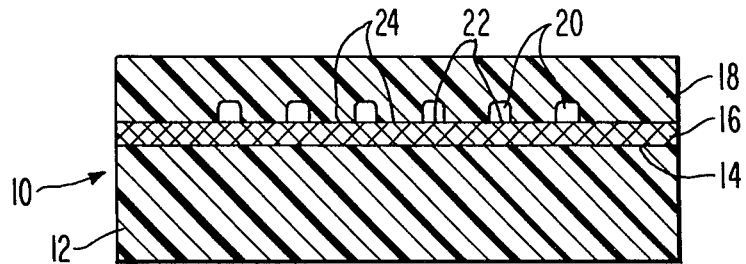
FIG. 1 is a schematic illustration of a crossectional view of an improved optical recording medium of the invention.

Referring to FIG. 1, an improved optical recording medium 10 of the invention 10 comprises a substrate 12 having a first major surface 14; an absorptive layer 16 overlies the major surface 14 of the substrate 12, and an overcoat layer 18 overlies the absorptive layer 16. The overcoat layer 18 has one or more indentations 20 in the surface which contacts the absorptive layer 16, thereby creating a first region 22 of the recording medium 10 wherein the overcoat layer does not contact the absorptive layer and a second region 24 wherein the overcoat layer does contact the absorptive layer.

Figure 2:
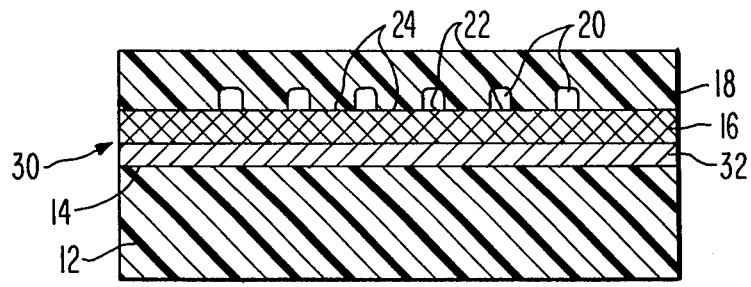
FIG. 2 is a schematic illustration of a crossectional view of a second embodiment of the invention.

Referring to FIG. 2, the indentation of the elements common to the recording medium 30 and the recording medium 10 shown in FIG. 1 is the same. The recording medium 30 differs from the recording medium 10 in that a reflective layer 32 is interposed between the substrate 12 and absorptive layer 16.

Figure 3:
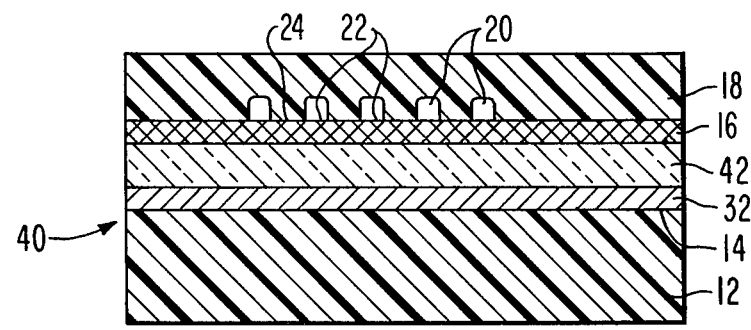
FIG. 3 is a schematic illustration of a crossectional view of a third embodiment of the invention.

Referring to FIG. 3, the identification of the elements common to the recording medium 40 and the recording medium 30 shown in FIG. 2 is the same. The recording medium 40 differs from the recording medium 30 in that a spacer layer 42 is interposed between the reflective layer 32 and the absorptive layer 16.

The substrate 12 may be formed of a glass or a plastic material such as polyvinyl chloride of (poly)methyl methacrylate, typically in the form of a disc. Alternatively, the substrate 12 may be formed of a material such as aluminum which reflects light at the recording wavelength thus combining the functions of the substrate 12 and the light reflective layer 16. A substrate need only be thick enough to support the remainder of the structure.

Since any roughness of the surface 14 of the substrate 12 on the scale of the focused light beam diameter will produce noise in the signal channel during read out, a subbing layer in the form of a non-conformal coating of a plastic material such as an epoxy or acrylic resin, may be deposited on the surface 14 prior to the formation of the absorptive layer 16 thereon. The subbing layer will have a microscopically smooth surface which reduces this noise source.

The reflective layer 32 reflects a substantial fraction of the incident light at the recording and readout wavelengths and is typically formed of metal such as aluminum or gold which has high reflectivity at these wavelengths. Preferably the reflective layer 32 reflects at least 50% of the light incident thereon and is typically about 30 to 60 nanometers thick. The reflective layer 32 may be deposited on the surface 14 of the substrate 12 or on the surface of the subbing layer, if present, using vacuum evaporation techniques. Alternatively, a single or multi-layer dielectric reflector may be used.

The absorptive layer 16 is formed of a material which has good optical quality and which is absorptive of light at the wavelength of a recording light beam. The surface of the absorptive layer which contacts the indented surface of the overcoat layer is smooth; that is, any roughness of the surface is, much smaller than the dimensions of the indentations. Suitable materials for the absorptive layer 16 of the first embodiment 10 and the third embodiment 40 include tellurium, selenium, tellurium and selenium based alloys, bismuth, titanium and rhodium. Suitable materials for the absorptive layer 16 of the second embodiment 30 include phthallocyanine dyes which absorb at about 820 nanometers and 4-phenylazo-1-naphthylamine which absorbs at 441.6 and 488.0 nanometers.

The spacer layer 42 of the recording medium 40 is formed of a material which is substantially transparent and non-scattering at the recording and readout wavelengths. Materials useful for this layer include silicon dioxide, silicon monoxide, titanium dioxide and aluminum oxide. These materials may be deposited on the reflective layer 32 using electron beam evaporation techniques. Alternatively, organic materials which can form a smooth coating may also be used. These materials may be deposited on the reflective layer using evaporation, spin coating or glow discharge deposition techniques.

The thickness of the absorptive layer 16 of the recording medium 10 is chosen so as to provide a balance between high reflectivity and high absorptivity. Typically the thickness of the layer 16 is between about 10 nanometers and 40 nanometers.

The thickness of the absorptive layer 16 of the recording medium 30 is chosen such that the reflectivity of the optical recording medium in the first regions is reduced and is preferably minimized corresponding to the anti-reflection condition. Typically the thickness of the layer 16 of the recording medium 30 is between about 20 nanometers and about 120 nanometers.

In the recording medium 40 the thickness of the spacer layer 42 and the absorptive layer 16 are so related to the optical constants of the reflective layer 32, the spacer layer 42, the absorptive layer 16 and the overcoat layer 18, that the reflectivity of the recording medium 40 in the first regions is reduced and is preferably minimized corresponding to the anti-reflection condition. The thickness of the spacer layer 42 is typically between about 10 nanometers and about 150 nanometers. The thickness of the absorptive layer 16 is typically between about 3 nonometers and about 40 nanometers.

the overcoat layer 18 is composed of a material which is substantially transparent at the wavelengths of the recording and readout light beams and which can form a non-scattering layer on the absorptive layer 16. The overcoat layer 20 is typically between about 0.05 and about 1 millimeter thick.

The overcoat layer 18 contains one or more indentations, which may be arranged as a circular on spiral groove or as an array of separate indentations along a track, in the face of the overcoat layer 18 which contacts the absorptive layer. The indentations typically extend a distance into the overcoat greater than about 100 nanometers and typically about 200 nanometers or more. If the indentations are in the form of grooves, the grooves will typically be between about 0.2 micrometer and about 2 micrometers wide and will be between about 0.5 and about 2.0 micrometers apart.

The overcoat layer may be formed using embossing, casting or compression molding techniques. Suitable materials include epoxy and silicone resins which may be formed using, for example, vacuum casting in a mold having a master of the grooves in one of its faces. Alternatively the indentations may be formed be compression molding a material such as polyvinyl chloride. The overcoat is then laminated to the absorptive layer of the optical recording medium using a suitable adhesive.

The optical recording medium thus formed is comprised of a first region where the overcoat layer does not contact the absorptive layer and a second region where the overcoat layer does contact the absorptive layer directly. Heat transfer from the absorptive layer to the overcoat layer in the first region will be less than in the second region since the transfer in these regions can only occur by radiative or convective processes. In the second region, direct conductive heat transfer can occur since the two layers are contacted. Thus, the recording sensitivity in the first region will be higher than in the second region since the heat loss is less. Also, since there is no contact between the absorptive and overcoat layers in the first region, mechanical constraints which may inhibit the formation of a deformation in the absorptive layer are limited. Thus, for a range of incident light powers above the threshold for recording, the formation of a deformation in the absorptive layer will be limited to the first region thereby permitting the use of a recording light beam whose diameter is greater than the desired width of the recorded track. It is to be noted however that, if the recording light beam power density incident on the recording medium is sufficiently large, the deformation can extend into the second regions where the overcoat layer contacts the absorptive layer.

Figure 4:
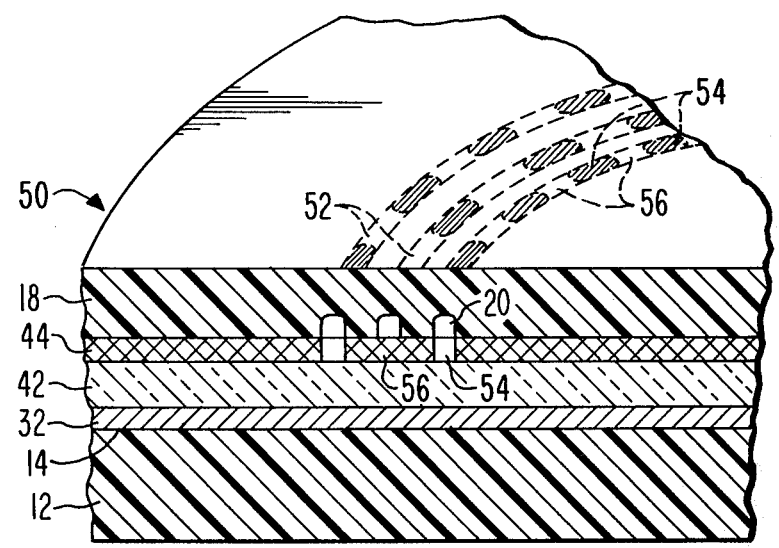
FIG. 4 is a perspective view of an information record of the invention having an information track recorded therein.

Referring to FIG. 4, a schematic illustration of a perspective view of an information record 50 having information recorded therein by exposure to a modulated recording light beam is shown. The identification of the elements common to the information record 50 and the recording medium 40 are the same. The indentations are arranged as a series of grooves 52 in the overcoat 18. The information track comprises one or more areas 54 in the first region which have different optical properties and which are spaced apart by unperturbed portions 56 of the first region absorptive layer. The areas 54 may be openings in the absorptive layer 16. The presence of the areas 54 or variations in either or both the length of the areas along the track and the spacing between the areas are representative of the recorded information. Similarly an information record may be composed of a recording medium as illustrated by the first and second embodiments 10 and 30 respectively and having one or more areas of the absorptive layer which have different optical properties.

The reflectivity of the optical recording medium in the first and second regions differ because the overcoat structures in the two regions differ. This difference in reflectivity can be used to provide tracking information to enable the recording or readout light beam to follow the path of the indentations.

I claim:

1. In an optical recording medium which comprises a substrate;
   an absorptive layer which overlies the substrate and which is composed of a material which is absorptive of light at the wavelength of a recording light beam; and
   an overcoat layer, contacting the absorptive layer, which is transmissive of light at the wavelength of the recording light beam;
   the improvement which comprises:
   the overcoat layer having one or more indentations in the surface which contacts the absorptive layer thereby forming first regions of the recording medium wherein the overcoat layer does not contact the absorptive layer and second regions wherein the overcoat layer does contact the absorptive layer and wherein the first regions are arranged as circular or spiral grooves spaced apart from one another by the second regions.

2. An optical recording medium according to claim 1 further comprising a reflective layer underlying the absorptive layer which reflects a substantial portion of the light incident thereon at the wavelength of the recording and a readout light beam.

3. An optical recording medium according to claim 2 wherein the thickness of the absorptive layer in the first regions is so chosen that the reflectivity of the recording medium is reduced.

4. An optical recording medium according to claim 2 further comprising a spacer layer interposed between the reflective and absorptive layers.

5. An optical recording medium according to claim 4 wherein the thicknesses of the spacer and absorptive layers are so chosen that the reflectivity of the recording medium in the first regions is reduced.

6. An optical recording medium according to claim 2 or 4 wherein the reflectivity of the recording medium is minimized.

7. An optical recording medium according to claim 2 wherein the absorptive layer is an organic material.

8. An optical recording medium according to claim 4 wherein the spacer layer is composed of a material selected from the group consisting of silicon dioxide, silicon monoxide, aluminum oxide and titanium dioxide.

9. An optical recording medium according to claim 4 wherein the spacer layer is an organic material.

10. An optical recording medium according to claim 1 or claim 4 wherein the absorptive layer is composed of a material selected from the group consisting of titanium, rhodium, tellurium, selenium, tellurium-based alloys, selenium-based alloys, arsenic trisulfide and arsenic triselenide.

11. An optical recording medium according to claim 1 wherein the indentations extend a distance into the thick overcoat layer greater than about 100 nanometers.

12. An optical recording medium according to claim 1 wherein a subbing layer is interposed between the substrate and the absorptive layer.

13. In an information record having an information track therein which comprises:
    a substrate;
    an absorptive layer which overlies the substrate and which is composed of a material which is absorptive of light at the wavelength of a recording light beam; and
    an overcoat layer, overlying the absorptive layer, which is transmissive of light at the wavelength of the recording light beam and a readout light beam;
    the improvement which comprises:
    the overcoat layer having one or more indentations in the surface which contacts the absorptive layer thereby forming first regions of the information recording medium wherein the overcoat layer does not contact the absorptive layer and wherein the first regions are arranged as circular or spiral grooves spaced apart from one another by the second regions;
    wherein the information track comprises areas of the first region having different optical properties from the unperturbed portions of the first region and which are spaced apart from one another along the groove only by unperturbed portions of the first region.

14. An information record according to claim 13 wherein a subbing layer is interposed between the substrate and the absorptive layer.

15. An information record according to claim 13 comprising a reflective layer, underlying the absorptive layer, which reflects a substantial portion of the light incident thereon at the wavelength of the recording and the readout light beam;

16. An information record according to claim 15 wherein the thickness of the absorptive layer is so chosen that the reflectivity of the record is reduced.

17. An information record according to claim 15 wherein a spacer layer is interposed between the reflective layer and the absorptive layer.

18. An information record according to claim 17 wherein the thicknesses of the spacer and absorptive layers are so chosen that the reflectivity of the record is reduced.

19. An information record according to claim 17 wherein the spacer layer is composed of a material selected from the group consisting of silicon monoxide, silicon dioxide, aluminum oxide, and titanium dioxide.

20. An information record according to claim 17 wherein the spacer layer is an organic material.

21. An information record according to claim 15 wherein the absorptive layer is an organic material.

22. An information record according to claim 13 or 17 wherein the absorptive layer is composed of a material selected from the group consisting of titanium, rhodium, tellurium, selenium, tellurium-based alloys, selenium based alloys, arsenic trisulfide and arsenic triselenide.

23. An information record according to claim 13 wherein the indentations extend a distance into the overcoat greater than about 100 nanometers.

24. In an optical recording medium which comprises:
    a substrate;

an absorptive layer which overlies the substrate and which is composed of a material which is absorptive of light at the wavelength of a recording light beam; and an overcoat layer, contacting the absorptive layer, which is transmissive of light at the wavelength of the recording light beam;

the improvement which comprises:

the overcoat layer having one or more indentations in the surface which contacts the absorptive layer thereby forming first regions of the recording medium wherein the overcoat layer does not contact the absorptive layer and second regions wherein the overcoat layer contacts the absorptive layer and wherein the surface of the absorptive layer which contacts the indented surface of the overcoat layer is smooth.

25. The article of claim 24 having an information track recorded therein wherein the information track comprises areas of the first regions having different optical properties from the remainder of the first regions.

26. The article of claim 24 or 25 further comprising a reflective layer interposed between the substrate and the absorptive layer.

27. The article of claim 26 wherein the thickness of absorptive layer is such that the reflectivity of the optical recording medium is minimized.

28. The article of claim 26 further comprising a spacer layer interposed between the reflective and absorptive layers.

29. The article of claim 28 wherein the thicknesses of the spacer and absorptive layers so adjusted that the reflectivity of the optical recording medium is minimized.

* * * * *